US012624682B2

(12) United States Patent
Soon-Shiong

(10) Patent No.: US 12,624,682 B2
(45) Date of Patent: May 12, 2026

(54) COMBINED POWER GENERATION USING GEOTHERMAL AND SOLAR ENERGY

(71) Applicant: Nant Holdings IP, LLC, Culver City, CA (US)

(72) Inventor: Patrick Soon-Shiong, Culver City, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

(21) Appl. No.: 19/029,489

(22) Filed: Jan. 17, 2025

(65) Prior Publication Data

US 2025/0237199 A1     Jul. 24, 2025

Related U.S. Application Data

(60) Provisional application No. 63/622,379, filed on Jan. 18, 2024.

(51) Int. Cl.
F03G 4/00         (2006.01)
F03G 6/00         (2006.01)

(52) U.S. Cl.
CPC ............. F03G 4/037 (2021.08); F03G 4/029 (2021.08); F03G 4/033 (2021.08); F03G 4/069 (2021.08); F03G 6/003 (2013.01); F03G 6/0055 (2021.08); F03G 6/071 (2021.08); F03G 6/111 (2021.08)

(58) Field of Classification Search
CPC .......... F03G 4/037; F03G 4/029; F03G 4/033; F03G 4/069; F03G 6/003; F03G 6/0055; F03G 6/071; F03G 6/111; F03G 4/074
USPC ...................... 60/641.2–641.4, 641.8–641.15
See application file for complete search history.

(56) References Cited

U.S. PATENT DOCUMENTS

| | | | | |
|---|---|---|---|---|
| 5,272,879 | A | * 12/1993 | Wiggs | F01K 25/08 |
| | | | | 60/671 |
| 9,297,367 | B2 | 3/2016 | Ramaswamy et al. | |
| 11,480,160 | B1 | 10/2022 | Mokheimer et al. | |
| 11,852,382 | B2 * | 12/2023 | Mokheimer | F24T 50/00 |
| 2009/0320473 | A1 * | 12/2009 | Krieger | F24S 23/74 |
| | | | | 60/671 |
| 2013/0255258 | A1 * | 10/2013 | Loveday | F02C 6/003 |
| | | | | 60/645 |
| 2014/0102094 | A1 * | 4/2014 | Shim | F03G 4/074 |
| | | | | 60/641.2 |

(Continued)

FOREIGN PATENT DOCUMENTS

| | | |
|---|---|---|
| WO | 2018102265 A1 | 6/2018 |
| WO | 2023150466 A1 | 8/2023 |

OTHER PUBLICATIONS

Li et al., "Continuous electrical pumping membrane process for seawater lithium mining", Energy Environmental Science, vol. 14, pp. 3152-3159, Mar. 30, 2021.

*Primary Examiner* — Hoang M Nguyen
(74) *Attorney, Agent, or Firm* — Umberg Zipser LLP; Martin Fessenmaier; Priti Phukan

(57)         ABSTRACT

Systems and methods are presented for enhancing energy production and storage by integrating solar energy with geothermal processes. In certain embodiments, a hybrid geothermal/solar system increases energy yield from a closed loop geothermal system, stores heat in a wellbore, enhances power generation from geothermal brine, and/or facilitates carbon dioxide sequestration or conversion to fuel, all preferably utilizing solar energy as a supplemental heat source.

19 Claims, 2 Drawing Sheets

(56)     References Cited

U.S. PATENT DOCUMENTS

| | | | |
|---|---|---|---|
| 2014/0165563 A1* | 6/2014 | Harrison | F24T 10/20 |
| | | | 423/155 |
| 2020/0095122 A1 | 3/2020 | Witchey et al. | |
| 2022/0243707 A1* | 8/2022 | Fleming | F24T 10/17 |
| 2025/0123416 A1* | 4/2025 | Kayode | E21B 43/00 |

* cited by examiner

COMBINED POWER GENERATION USING GEOTHERMAL AND SOLAR ENERGY

This application claims priority to our U.S. provisional patent application with the Ser. No. 63/622,379, which was filed Jan. 18, 2024, and which is incorporated by reference herein.

FIELD OF THE INVENTION

The field of the invention is systems and methods for hybrid power systems, especially as it relates to a combination of solar and geothermal energy in the context of power generation and storage, lithium recovery, and/or carbon dioxide capture and chemical synthesis from captured or produced carbon dioxide.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Renewable energy production has gained significant attention over the last few decades, and efforts to decentralize power generation and/or use of local or regional sources of energy have led to significantly improved power generation systems. In addition to widely accepted and relatively small-scale photovoltaic power generation systems, geothermal and solar energy harvest have become increasingly economically feasible. However, geothermal energy harvest is often limited to relatively low temperatures and slow formation depletion, while solar energy harvest is cyclical in nature and also location dependent for significant power output.

To overcome at least some of these disadvantages, power generation schemes have been developed that collocate geothermal and solar energy harvest. For example, U.S. Pat. No. 9,297,367 discloses a combined geothermal and solar thermal organic Rankine cycle (ORC) to produce electric power. Here, the thermal energy from the geothermal fluid is used to power an ORC, which is augmented by solar energy that increases the temperature of the organic working fluid. In most typical embodiments, the collected solar energy assists or supplants geothermal energy in a single hybrid heat exchanger or in multiple sequential heat exchangers. Similarly, U.S. Pat. No. 11,480,160 describes systems and methods for a hybrid geothermal electrical power generation plant that utilizes the heat from a deep geothermal reservoir to vaporize a working fluid and a solar collector is then used to increase the temperature of the working fluid during sunlight hours. In addition, a thermal storage unit may be utilized to increase the temperature of the working fluid during the night.

In still another example, WO 2018/102265 describes various systems and methods for power generation in which geothermal heat assists in heating a heat transfer fluid of a concentrated solar power field. As such, at least some of the geothermal energy is transferred to a second working fluid that is also heated by the concentrated solar power field. While such and other hybrid systems provide at least some benefits in terms of electrical power production, the geothermal fluid from a conventional or enhanced geothermal production well must be in most cases re-injected into the formation, and where not re-injected, the spent geothermal fluid will become an environmental liability above ground.

To circumvent at least some of the issues associated with conventional or enhanced geothermal production wells, closed loop geothermal systems have been developed as, for example, described in WO 2023/150466 in which a downhole heat exchange system is in enhanced thermal contact with typically hot dry rock at a considerable depth and relatively high temperature. While such systems are generally thought to have desirable heat harvesting and environmental properties, integration with solar energy systems have not been attempted, possibly due to the significant depth of the hot rock formation.

Thus, even though various systems and methods of combined power cycles are known in the art, all or almost all of them suffer from several drawbacks. Therefore, there remains a need for improved power generation using geothermal and solar energy.

SUMMARY OF THE INVENTION

The inventive subject matter is directed to methods and systems for the generation, storage, and enhancement of electrical energy by integrating solar energy with geothermal processes. The inventive subject matter is primarily concerned with the utilization of a closed loop geothermal system that is augmented by solar energy to increase the efficiency and output of power generation cycles. Advantageously, contemplated systems and methods provide a versatile and efficient approach to renewable energy production and storage, leveraging the natural thermal energy of the earth and the abundant energy from the sun.

One aspect of the inventive subject matter is a method of generating electrical energy that involves heating a working fluid within a closed loop geothermal system using solar energy. The system includes a topside portion that is thermally coupled to a power cycle and a downhole portion that is thermally coupled to a geothermal formation. The working fluid is heated either before or after thermal energy extraction, and the heat may be provided via a heat exchanger that is thermally coupled to a solar energy harvesting circuit. Thermal energy is extracted from the working fluid using a power cycle to thereby generate electrical energy.

As will be readily appreciated, the working fluid may be heated in the topside portion of the closed loop geothermal system. In some embodiments, the working fluid may also be heated via a heat exchanger that is thermally coupled to a solar energy harvesting circuit. Most typically, the downhole portion may be disposed within a wellbore to form an annular space between the wellbore and the downhole portion, wherein the solar energy heats the working fluid in the downhole portion via a heat transfer fluid in the annular space. Preferably, the wellbore is fluidly coupled to the closed loop geothermal system and is thermally insulated by a low-k material comprising sand, a cementitious material, or fiberglass. In various embodiments, the wellbore may be co-located with the closed loop geothermal system.

Moreover, a second wellbore may be proximal to the wellbore, wherein the solar energy heats a heat transfer fluid in the second wellbore, and wherein the working fluid in the downhole portion is heated by heat transfer through the hot formation from the second wellbore. In some embodiments, the wellbore and the second wellbore are thermally coupled by a fracture network that is at least partially filled with a thermally conductive material comprising a proppant, water, zinc, or a carbonaceous material. In other embodiments, the wellbore and the second wellbore are part of a wellbore grid comprising a grid controller that controls flow and/or temperature of the heat transfer fluid.

The inventive subject matter also includes a method for processing geothermal brine, which involves producing the brine from a formation and using its heat content to heat a working fluid of a power cycle to thereby generate electrical energy and a resulting cooled geothermal brine. Solar energy is employed to further heat the geothermal brine or the working fluid, thereby increasing power generation in the power cycle. Additionally, solar energy can be used to heat the cooled geothermal brine to evaporate water and concentrate minerals within the brine.

As will be readily appreciated, the geothermal brine may be produced by a geothermal well or an enhanced geothermal well. In some embodiments, the power cycle is a closed Ranking cycle. In addition, the solar energy may heat the geothermal brine before or after heating the working fluid. In various embodiments, the solar energy evaporates all water in the geothermal brine to produce a dry mineral product and distilled water. Most typically, the inventive subject matter further comprises a step of processing the geothermal brine by electrochemical enrichment, ultrafiltration, or reverse osmosis to thereby isolate or enrich a metal salt or metal oxide. Preferably, the metal salt or metal is a lithium salt or a lithium oxide.

Lastly, the inventive subject matter contemplates a hybrid geothermal/solar system that includes a closed loop geothermal system thermally coupled to a power cycle and a solar energy harvester that is thermally coupled to the closed loop geothermal system to increase energy yield from the closed loop geothermal system. The inventive subject matter may alternatively include a closed loop geothermal system thermally coupled to a heat storage wellbore, wherein a heat transfer fluid in the heat storage wellbore is heated by a solar energy harvester. Such a configuration may further include a geothermal system configured to produce a geothermal brine from a geothermal wellbore, wherein the geothermal system is thermally coupled to a power cycle with a working fluid, and wherein a solar energy harvester is configured to increase power in the power cycle and/or to heat a cooled geothermal bring to thereby evaporate water and concentrate a mineral in the geothermal brine. In yet another embodiments, the inventive subject matter may include a carbon dioxide source that is configured to produce a concentrated carbon dioxide product and that is operationally coupled to geothermal system and a solar energy harvester, wherein the geothermal/solar system is configured to use geothermal and solar energy to sequester the concentrated carbon dioxide product into a geological formation and/or to chemically convert the concentrated carbon dioxide product to a fuel product. This system is designed to increase the energy yield from the geothermal system, store heat in a wellbore, enhance power generation from geothermal brine, and facilitate carbon dioxide sequestration or conversion, all through the use of solar energy as a supplementary heat source.

The invention thus provides a versatile and efficient approach to renewable energy production and storage, leveraging the natural thermal energy of the earth and the abundant energy from the sun.

Various objects, features, aspects, and advantages of the inventive subject matter will become more apparent from the following detailed description of preferred embodiments.

DETAILED DESCRIPTION

Figure 1:
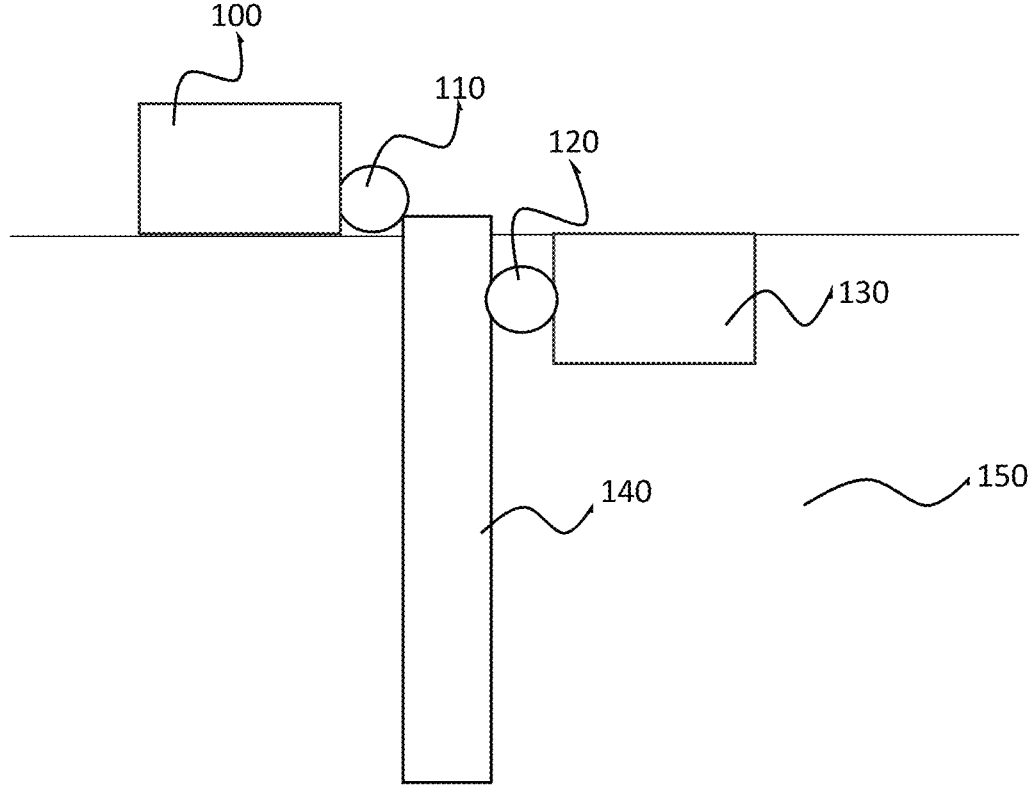
FIG. 1 is an exemplary illustration depicting a closed loop geothermal system thermally coupled to a power cycle and a solar energy harvester that is thermally coupled to the closed loop geothermal system.

The inventor has now appreciated various systems and methods in which geothermal and solar energy can be used to in variety of processes that enhance energy production and energy storage, improves processing of geothermal brine, and that enhance processing of carbon dioxide. Advantageously, the combined energy harvested from geothermal and solar operations will complement and improve processes compared to processes relying only on geothermal and solar operations alone, and excess energy can be stored in significantly enhanced fashion.

As will be discussed in more detail below, a hybrid geothermal/solar system is generally contemplated that comprises (a) a closed loop geothermal system thermally coupled to a power cycle, and a solar energy harvester that is thermally coupled to the closed loop geothermal system to increase energy yield from the closed loop geothermal system; or (b) a closed loop geothermal system thermally coupled to a heat storage wellbore, wherein a heat transfer fluid in the heat storage wellbore is heated by a solar energy harvester; or (c) a geothermal system configured to produce a geothermal brine from a geothermal wellbore, wherein the geothermal system is thermally coupled to a power cycle with a working fluid, and wherein a solar energy harvester is configured to increase power in the power cycle and/or to heat a cooled geothermal brine to thereby evaporate water and concentrate a mineral in the geothermal brine; and/or (d) a carbon dioxide source that is configured to produce a concentrated carbon dioxide product and that is operationally coupled to a geothermal system and a solar energy harvester, wherein the geothermal/solar system is configured to use geothermal and solar energy to sequester the concentrated carbon dioxide product into a geological formation and/or to chemically convert the concentrated carbon dioxide product to fuel product.

For example, in systems and methods for generating electrical energy using a closed loop geothermal power production plant, solar energy may not only be used to augment the power cycle by adding solar energy to the working fluid of the power cycle, but may also be used to reduce or even avoid loss of thermal energy in the formation where heat is extracted from the formation by the downhole heat harvesting structure of the closed loop geothermal production plant. Therefore, it is contemplated that a hybrid geothermal/solar system may include a closed loop geothermal system that is thermally coupled to a power cycle, and a solar energy harvester that is thermally coupled to the closed loop geothermal system to thereby increase energy yield from the closed loop geothermal system. In this context, it should be appreciated that closed loop geothermal power production plants harvest thermal energy at relatively large depths (e.g., at least 200 m, or at least 500 m, or at least 1,000 m, or at least 2,000 m, or at least 5,000 m) in geological formations that are typically dry and impermeable (e.g., igneous or metamorphous rock having permeability of less than 1 mDarcy). As such, heat is typically harvested by conduction from the formation to the heat harvesting structure(s) that is/are located downhole at a hot target area in a formation. Depending on the particular depth, the formation may have a geostatic temperature of between 200-300° F., or between 250-400° F., or between 300-500° F., and in some cases even higher. Moreover, it should be noted that the heat harvesting structures in such closed loop geothermal systems will extend along the length of a borehole in the target area, and that the heat harvesting structures may have a length of at least 500 m, or at least 1,000 m, or at least 2,000 m, or at least 3,000 m, and even longer. Furthermore, it should be noted that the heat harvesting structures may be vertically oriented or be oriented along the geometry of a deviated borehole, including a horizontal orientation.

Therefore, the geological nature and location of wellbores contemplated herein may vary considerably, and it should be appreciated that suitable wellbores include existing mines (e.g., salt mines), boreholes from (exhausted) hydrocarbon production, horizontally oriented mines, newly drilled boreholes, etc. In some embodiments, the wellbore may also be an exhausted wellbore from oil and/or gas production. In other embodiments, the wellbore may be an exhausted wellbore from a geothermal operation. Likewise, it should be appreciated that the boreholes may be placed in geologically stable locations (e.g., no significant fault or earthquake activity, no volcanic activity, etc.) but may also be placed where geothermal heat is closer to a surface such as tectonic plate boundaries, areas with volcanic activity, etc. Preferably, wellbores and boreholes will be located in a place with reduced or no environmental impact on subsurface life and structures (e.g., subsurface reservoirs and aquifers).

In further contemplated embodiments, it should be noted that the closed loop geothermal system will have a closed loop working fluid circuit having a topside portion that is thermally coupled to a power cycle and a downhole portion that is thermally coupled to a hot formation 150 as shown in FIG. 1. While not limiting the inventive subject matter, it is generally preferred that the working fluid in the closed loop geothermal system is an aqueous fluid or that the working fluid is a single or compound fluid commonly used in organic Rankine cycles. Most typically, the closed loop working fluid circuit is then thermally coupled to a power cycle 130 via one or more heat exchangers 120. Most typically, the heat exchanger may be placed at a topside or downhole location. However, in various embodiments, the location of the heat exchanger may vary within the wellbore depending on the portion of the wellbore that has the most thermal energy. In that context it is noted that such heat exchanger(s) or additional separate heat exchangers 110 can be further coupled to a solar energy harvesting circuit 100 that delivers thermal energy from a solar energy harvesting system to the working fluid of the closed loop geothermal system 140. As will be readily appreciated, the thermal energy from the solar energy harvesting system can be provided to the working fluid before or after thermal energy is extracted by the power cycle. Regardless of the place of heat augmentation, it should therefore be appreciated that solar energy can augment a power cycle at a topside location of the closed loop geothermal system.

Additionally, or alternatively, it is contemplated that thermal energy from the solar energy harvesting system can also be delivered to a location in the wellbore and/or formation. For example, a heat transfer fluid may be heated by the solar energy harvesting system which is then pumped downhole in the annular space that is formed between the casing of the heat harvesting structure of the closed loop geothermal system and the wall of the wellbore. It should be especially appreciated that such systems will not only deliver thermal energy from the solar energy harvesting system to the heat harvesting structure of the closed loop geothermal system, but that the heat transfer fluid also forms a continuous heat transfer interface between the formation and the casing of the heat harvesting structure, thereby optimizing thermal energy transfer between the formation and the heat harvesting structure. Thus, the formation can also be considered as a storage system for the solar thermal energy. For example, in some embodiments the heat can be stored in a molten salt storage facility (see e.g., US 2020/0095122). As will be readily appreciated, the stored heat may be used to maintain an already molten salt medium in a molten state or may be used to increase the temperature of the molten salt.

It is additionally contemplated that the wellbore of the closed loop geothermal system may be in thermal contact with at least one adjacent second wellbore that contains a heat transfer fluid that is heated by thermal energy from the solar energy harvesting system. In such embodiments, the thermal energy of the heat transfer fluid in the second wellbore heats the formation in the proximity of the wellbore of the closed loop geothermal system, thereby reducing gradual loss of thermal energy in the formation over time. Consequently, it should be appreciated that the solar energy can be used to reduce or even entirely avoid thermal loss and as such maintain power yield over an extended period or even the lifetime of the closed loop geothermal power plant.

Where a second wellbore with a heat transfer fluid is employed, it is further contemplated that the heat transfer from the heat transfer fluid to the casing of the heat harvesting structure may be further enhanced by generating of a fracture network in the formation that may then be filled with a thermally conductive (preferably high thermal k) material. As will be readily appreciated, such fracture network may be maintained at pressure, or more preferably be maintained by a proppant. Suitable proppants may include silica sand, quartz sand, resin-coated sand, or taoli sand. Most typically, the thermally conductive material in the fracture network may contain a material having a k-value of at least 1-3 W/mK, or at least 2-5 W/mK, and even higher. Therefore, suitable materials include water, and slurries of water plus thermally conductive materials, as well as metals, metal oxides, carbonaceous materials, etc. Additional exemplary thermally conductive materials include zinc, graphite, graphene, tungsten, aluminum, silicon carbide, aluminum nitride, silicon nitride, boron nitride, gold, copper, silver, diamond, aluminum alloys, aluminum oxides, rhodium, zinc, cobalt, copper alloys, nickel, iron, platinum, palladium, tin, steel, zirconium, titanium, carbon fiber, carbon black, and Hastelloy, and optionally wherein the thermally conductive material comprises at least two chemically distinct particles selected from the group consisting of zinc, graphite, graphene, tungsten, aluminum, silicon carbide, aluminum nitride, silicon nitride, boron nitride, gold, copper, silver, diamond, aluminum alloys, aluminum oxides, rhodium, zinc, cobalt, copper alloys, nickel, iron, platinum, palladium, tin, steel, zirconium, titanium, carbon fiber, carbon black, and Hastelloy. In some embodiments, the thermally conductive material in the fracture network will be a slurry, or a solid, or a molten metal that may have a melting point below the formation temperature. Consequently, heat transfer from the second wellbore to the closed loop geothermal system may be enhanced above the rate otherwise present via conduction through the formation only.

Where a closed loop geothermal system in a wellbore is thermally coupled to a second wellbore containing a heat transfer fluid that is heated by solar energy, it should be appreciate that such arrangement may be enhanced by using multiple spatially separated wellbores with closed loop geothermal systems and multiple second wellbores with heat transfer fluids. Most preferably, such arrangement would form a grid (e.g., square grid, hexagonal grid, etc.) in which one closed loop geothermal system in a wellbore is surrounded by at least two or at least three or at least four, or at least five, or at least six second wellbores that provide solar thermal energy. As will be readily appreciated, the grid architecture will be at least in part dictated by the specific geological situation (typically with respect to mineral type, porosity, and thermal k values) at a site of operation. Therefore, grid architectures for such hybrid systems are contemplated in which solar thermal energy augments geothermal energy in the formation at the target area. As will be recognized, a grid controller will be able to control energy flow to and from these wells (e.g., in situations where the heat in the borehole is too high so some heat transfer fluid is pulled out and stored elsewhere), typically via control of the flow rate and/or temperature of the working fluid and/or the heat transfer fluid. Most typically, such grid controller operation will optimize the various parameters (e.g., quantity of heat stored, residual storage capacity per well, heat available for storage, etc.), for example, using 2D or 3D heat distribution maps.

In still further embodiments, and especially where the heat transfer fluid is water, it should be appreciated that the heat transfer fluid in the second wellbore(s) may be superheated to a temperature of at least 750° F., or at least 800° F., or at least 950° F., at which the so superheated water has a substantially increased capacity to store thermal energy (5-10× above heat capacity of steam). Therefore, solar energy may not only supplement geothermal energy, but excess solar energy may be temporarily and effectively stored.

Figure 2:
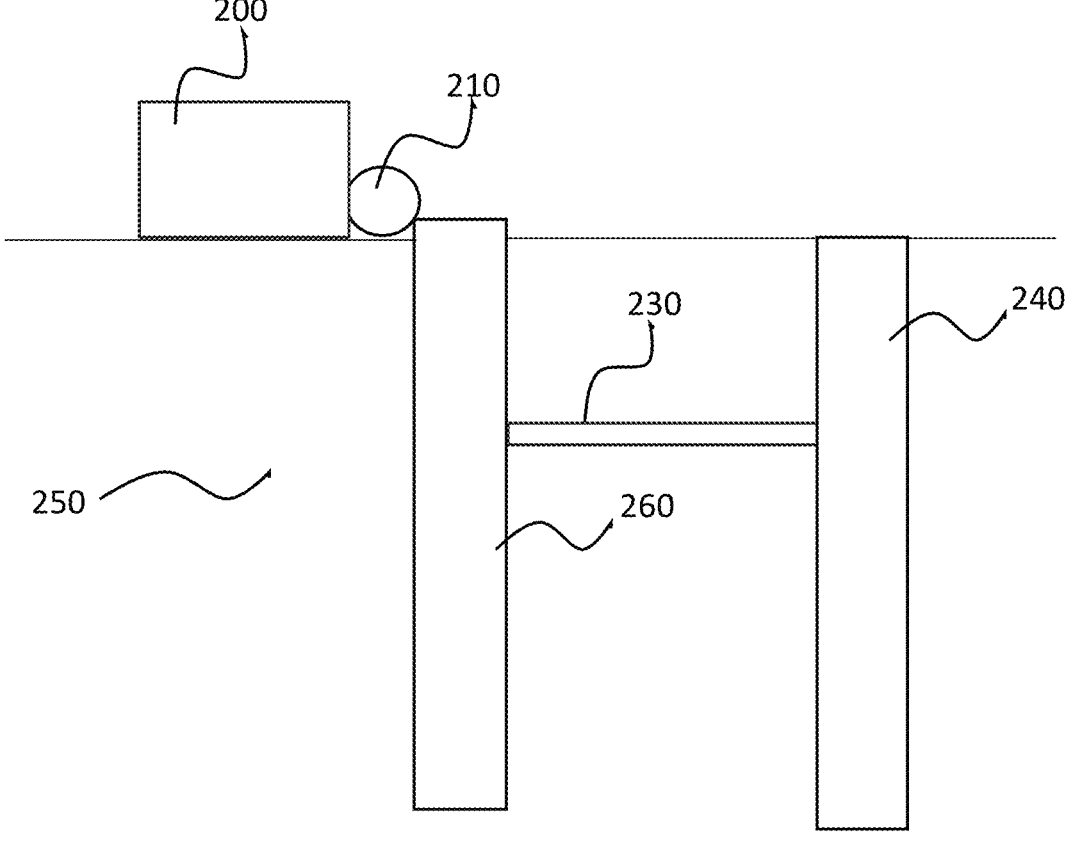
FIG. 2 is an exemplary illustration depicting a closed loop geothermal system thermally coupled to a heat storage wellbore.

Consequently, in a further example, and as shown in FIG. 2, the inventor contemplates a hybrid geothermal/solar system in which a closed loop geothermal system 240 within a geological formation 250 is thermally coupled via a heat exchanger 230 to a heat storage wellbore 260. In some embodiments, a heat transfer fluid in the heat storage wellbore is heated by a solar energy harvester 200 and 210. However, while a combination of the heat storage wellbore with a closed loop geothermal system is preferred, it should be noted that stand-alone heat storage wellbores are also expressly contemplated herein.

In some embodiments, the inventor contemplates a method of storing solar energy in which a heat transfer fluid is heated using solar energy. The so heated heat transfer fluid is then transferred into a wellbore within a formation, wherein the wellbore is thermally insulated from the formation and preferably fluidly coupled to a closed loop geothermal system. As noted above, it is generally preferred that the closed loop geothermal system will be implemented in a target area of a formation that has a relatively high geostatic temperature, typically at least 250° F., or at least 350° F., or at least 450° F. Therefore, and in addition to the already 'pre-heated' heat transfer fluid (due to the formation temperature), additional solar energy can be used to further increase the temperature of the stored heat transfer fluid to a temperature at or above 750° F., at which the heat capacity for storing thermal energy substantially increases. While this example is provided for aqueous heat transfer fluids, it should be appreciated that numerous alternative heat transfer fluids are also deemed suitable and that the superheated temperature may therefore be above or below 750° F. At a later point in time (e.g., within hours, days, or weeks), at least some of the stored heat can then be transferred from the heated heat transfer fluid to a working fluid of a closed loop geothermal system to so augment the power yield in a closed loop geothermal system. The heated heat transfer fluid may also be pumped to a heat exchanger to transfer at least some of the stored heat.

In some embodiments, it is contemplated that the heat transfer fluid is heated using the solar thermal energy while the heat transfer fluid is still within the wellbore. Most typically, such heat transfer can be performed using downhole heat exchangers well known in the art. Alternatively, thermal solar energy can also be used topside to heat the heat transfer fluid, most typically with a suitable heat exchanger (e.g., tube-in-shell, tube-in-tube, etc.). Additionally, it is contemplated that the heat transfer fluid is a working fluid of the closed loop geothermal system and is circulated in the closed loop geothermal system. As such, the heat storage system and the closed loop geothermal system may be fluidly or thermally coupled to each other. For example, the heat transfer fluid may be combined with the return fluid from the closed loop geothermal system to even further increase the temperature of the working fluid. A fraction of the combined working fluid can then be fed back to the heat storage system. As will be readily appreciated, solar thermal energy can be transferred to the heat transfer fluid at a top side or downhole location.

Suitable wellbores for the heat transfer fluid can be thermally insulated with a low-k material and particularly contemplated materials include sand, various cementitious materials, and/or fiberglass. Most preferably, the wellbore for heat storage will be co-located with the closed loop geothermal system, and among other options, the wellbores presented herein can be newly drilled wellbores and/or wellbores form exhausted oil and/or gas production plants or thermally depleted or otherwise disused wellbores.

In yet another example of the inventive subject matter the inventor also contemplates a geothermal system that is configured to produce geothermal brine from a geothermal wellbore for power production, wherein the geothermal system is thermally coupled to a power cycle with a working fluid. A solar energy harvester is then configured to increase power in the power cycle and/or to heat a cooled geothermal brine to thereby evaporate water and concentrate a mineral in the geothermal brine.

Therefore, it should be appreciated that a conventional geothermal power plant, and even an enhanced geothermal power plant, can be modified or constructed to include a solar energy system that produces energy to increase power yield in a power cycle (e.g., Rankine cycle or open power cycle) and/or to help power a plant in which water from the produced brine is evaporated and subsequently condensed to yield potable water and a concentrated mineral product.

As will be readily appreciated, the solar energy may be used to further heat the brine and/or working fluid of a power cycle that is thermally coupled to the extracted brine. As such, the power output of a turbine driven by the brine or a working fluid can be significantly increased. In addition, or alternatively, the solar energy may also be used to heat the brine after extraction of work from the brine. In such case, the solar energy may be used to reheat the brine for another power cycle or may be used to evaporate water from the extracted brine. Once evaporated, the water is then condensed to yield potable water and a concentrated mineral product (typically a dry mineral product). The so produced mineral product can then be further processed to isolate one or more compounds of economic interest such as a metal salt or metal oxide. For example and depending on the location of the geothermal plant (e.g., Salton Sea, CA, Smackover Formation, AR), the mineral product will be rich in lithium salts or oxides that may be further processed to produce a purified and enriched lithium product. Isolation processes may include an electrochemical enrichment, an ultrafiltration, or a reverse osmosis.

In further contemplated aspects of such plants, the solar energy may be used to generate electrical power in a separate or combined power cycle to process the mineral product. For example, electrical power may be used to drive an electrochemical enrichment process (see e.g., Energy and Environmental Science 14, 3152-3159 (2021)), an ultrafiltration plant, or a reverse osmosis plant.

In still another example of a hybrid geothermal/solar system, the inventor contemplates a plant configuration in which a carbon dioxide source is configured to produce a concentrated carbon dioxide product and that is operationally coupled to a geothermal system and a solar energy harvester, wherein the geothermal/solar system is configured to use geothermal and solar energy to sequester the concentrated carbon dioxide product into a geological formation and/or to chemically convert the concentrated carbon dioxide product to a fuel product. In some embodiments, the geothermal and/or the solar energy are converted in a power cycle to electric energy and at least some of the electric energy is sued for sequestration and/or chemical conversion.

For example, especially contemplated carbon dioxide sources include a direct air capture unit, a decarbonization unit of a fossil fuel power plant (which may be amine solvent-based or which may use a reverse sublimation process), an acid gas removal unit in a natural gas processing plant, and even a heliostat in which a carbonate rich material is thermally decomposed to produce carbon dioxide. Consequently, it should be appreciated that the concentrated carbon dioxide product may have a carbon dioxide concentration of at least 5 vol %, or at least 10 vol %, or at least 20 vol %, or at least 40 vol %, or at least 75 vol %, or at least 90 vol %, or at least 95 vol % at STP, or even higher. Moreover, it is contemplated that the concentrated carbon dioxide product may be in liquid form or as a gas.

In one embodiment, where the carbon dioxide source is a heliostat and where the carbon dioxide is produced from thermolysis of a carbonate such as aragonite as is, for example, described in U.S. Pat. No. 11,649,550, incorporated by reference herein, the solar energy cannot only be used to generate the carbon dioxide product but also to produce sufficient energy to convert at least some of the carbon dioxide into a fuel such as methane, ethanol, or a Fischer-Tropsch liquid. To that end, the heliostat will produce sufficient electrical energy to power an electrochemical catalytic reduction of the carbon dioxide. Alternatively, the heliostat may also generate sufficient temperatures to power a catalytic reduction of the carbon dioxide to the fuel. Where desired, a (closed loop) geothermal system may further provide energy for the reduction of the carbon dioxide. Furthermore, it is contemplated that where a geothermal brine has a relatively high content of carbon dioxide, the geothermal plant may also be the carbon dioxide source. Thus, it should be appreciated that a colocation of a geothermal facility with a solar energy capture facility will provide heretofore unappreciated advantages.

In another embodiment, where the carbon dioxide source is a direct air capture unit, solar energy of a solar power cycle and/or geothermal energy of a geothermal power plant may be used to provide most of the operational requirements for the regeneration of the direct air capture unit and may even be used to power compression and/or liquefaction prior to sequestration into a formation. Advantageously, sequestration can be done using newly drilled wellbores or wellbores of existing or abandoned geothermal power plants.

In still other embodiments, where the carbon dioxide source comprises a decarbonization unit of a fossil fuel power plant or acid gas removal unit of a natural gas processing plant, solar energy of a solar power cycle and/or geothermal energy of a geothermal power plant may be used to power compression and/or liquefaction prior to sequestration into a formation.

In some embodiments, the numbers expressing quantities of ingredients, properties such as concentration, reaction conditions, and so forth, used to describe and claim certain embodiments of the invention are to be understood as being modified in some instances by the term "about." As used herein, the terms "about" and "approximately", when referring to a specified, measurable value (such as a parameter, an amount, a temporal duration, and the like), is meant to encompass the specified value and variations of and from the specified value, such as variations of +/−10% or less, alternatively +/−5% or less, alternatively +/−1% or less, alternatively +/−0.1% or less of and from the specified value, insofar as such variations are appropriate to perform in the disclosed embodiments. Thus, the value to which the modifier "about" or "approximately" refers is itself also specifically disclosed. The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A method of generating electrical energy, comprising:
heating a working fluid in a closed loop geothermal system using solar energy;
wherein the closed loop geothermal system comprises a closed loop working fluid circuit having (a) a topside portion that is thermally coupled to a power cycle and (b) a downhole portion that is thermally coupled to a hot formation;
wherein the downhole portion is disposed within a wellbore to form an annular space between the wellbore and the downhole portion, and wherein the solar energy heats the working fluid in the downhole portion via a heat transfer fluid in the annular space; and
extracting thermal energy from the working fluid using the power cycle to thereby generate electrical energy.

2. The method of claim 1, wherein the working fluid is heated in the topside portion of the closed loop geothermal system.

3. The method of claim 1, wherein the working fluid is heated before thermal energy is extracted.

4. The method of claim 1, wherein the working fluid is heated after thermal energy is extracted and wherein the so heated working fluid is used to generate additional power.

5. The method of claim 1, wherein the working fluid is heated via a heat exchanger that is thermally coupled to a solar energy harvesting circuit.

6. The method of claim 1, wherein the wellbore is fluidly coupled to the closed loop geothermal system.

7. The method of claim 1, wherein the wellbore is thermally insulated by a low-k material comprising sand, a cementitious material, or fiberglass.

8. The method of claim 1, wherein the wellbore is co-located with the closed loop geothermal system.

9. The method of claim 1, wherein a second wellbore is proximal to the wellbore, wherein the solar energy heats a heat transfer fluid in the second wellbore, and wherein the working fluid in the downhole portion is heated by heat transfer through the hot formation from the second wellbore.

10. The method of claim 9, wherein the wellbore and the second wellbore are thermally coupled by a fracture network that is at least partially filled with a thermally conductive material comprising a proppant, water, zinc, or a carbonaceous material.

11. The method of claim 9, wherein the wellbore and the second wellbore are part of a wellbore grid comprising a grid controller that controls flow and/or temperature of the heat transfer fluid.

12. A method of processing a geothermal brine, comprising:
producing from a formation a hot geothermal brine;

heating a working fluid of a power cycle using heat content of the hot geothermal brine, thereby causing the hot geothermal brine to become a cooled geothermal brine;
wherein the power cycle is thermally coupled to a topside portion of a closed loop working fluid circuit, wherein the closed loop working fluid circuit further comprises a downhole portion that is thermally coupled to a hot formation;
wherein the downhole portion is disposed within a wellbore to form an annular space between the wellbore and the downhole portion, and wherein solar energy heats the working fluid in the downhole portion via a heat transfer fluid in the annular space;
using solar energy to heat the hot geothermal brine and/or the working fluid to thereby increase power generation in the power cycle, and/or using the solar energy to heat the cooled geothermal brine to thereby evaporate water and concentrate a mineral in the cooled geothermal brine.

13. The method of claim 12, wherein the hot geothermal brine is produced by a geothermal well or an enhanced geothermal well.

14. The method of claim 12, wherein the power cycle is a closed Rankine cycle.

15. The method of claim 12, wherein the solar energy heats the hot geothermal brine before or after heating the working fluid.

16. The method of claim 12, wherein the solar energy evaporates all water in the cooled geothermal brine to produce a dry mineral product and distilled water.

17. The method of claim 12, further comprising a step of processing the cooled geothermal brine by electrochemical enrichment, ultrafiltration, or reverse osmosis to thereby isolate or enrich a metal salt or metal oxide.

18. The method of claim 17, wherein the metal salt or metal is a lithium salt or a lithium oxide.

19. A hybrid geothermal/solar system, comprising:
(a) a closed loop geothermal system thermally coupled to a power cycle, and a solar energy harvester that is thermally coupled to the closed loop geothermal system to increase energy yield from the closed loop geothermal system; or
(b) a closed loop geothermal system thermally coupled to a heat storage wellbore, wherein a heat transfer fluid in the heat storage wellbore is heated by a solar energy harvester;
(c) a geothermal system configured to produce a geothermal brine from a geothermal wellbore, wherein the geothermal system is thermally coupled to a power cycle with a working fluid, and wherein a solar energy harvester is configured to increase power in the power cycle and/or to heat a cooled geothermal brine to thereby evaporate water and concentrate a mineral in the geothermal brine; or
(d) a carbon dioxide source that is configured to produce a concentrated carbon dioxide product and that is operationally coupled to a geothermal system and a solar energy harvester, wherein the carbon dioxide source is selected from the group consisting of a direct air capture unit, a decarbonization unit of a fossil fuel power plant, and an acid gas removal unit, wherein the geothermal/solar system is configured to use geothermal and solar energy to sequester the concentrated carbon dioxide product into a geological formation and/or to chemically convert the concentrated carbon dioxide product to a fuel product.

* * * * *